(12) United States Patent
Abe et al.

(10) Patent No.: US 6,998,808 B2
(45) Date of Patent: Feb. 14, 2006

(54) POSITIONING APPARATUS USING BRUSHLESS MOTOR

(75) Inventors: Hidefumi Abe, Tochigi-ken (JP);
Takaharu Sugawara, Tochigi-ken (JP);
Morihiro Yamada, Tochigi-ken (MP)

(73) Assignee: Keihin Corporation, Tokyo (JP)

(*) Notice: Subject to any disclaimer, the term of this patent is extended or adjusted under 35 U.S.C. 154(b) by 78 days.

(21) Appl. No.: 10/628,455

(22) Filed: Jul. 29, 2003

(65) Prior Publication Data

US 2004/0119428 A1 Jun. 24, 2004

(30) Foreign Application Priority Data

Sep. 10, 2002 (JP) ............... 2002-263801

(51) Int. Cl.
*G05D 3/00* (2006.01)
*H02P 3/00* (2006.01)
*G05G 5/00* (2006.01)

(52) U.S. Cl. .................. 318/466; 318/560; 318/567; 318/626

(58) Field of Classification Search ........... 318/466, 318/626, 468, 470, 568.11, 568.12, 568.17, 318/568.2, 594, 265, 266
See application file for complete search history.

(56) References Cited

U.S. PATENT DOCUMENTS

| | | | | |
|---|---|---|---|---|
| 5,521,480 A | * | 5/1996 | Yeo ............................. | 318/626 |
| 5,744,923 A | * | 4/1998 | Strauss et al. ............... | 318/563 |
| 5,760,558 A | * | 6/1998 | Popat .......................... | 318/480 |
| 5,777,446 A | * | 7/1998 | Knab et al. .................. | 318/265 |
| 5,872,434 A | * | 2/1999 | Hill .............................. | 318/159 |
| 6,346,788 B1 | * | 2/2002 | Nagai et al. ................. | 318/432 |
| 6,639,374 B1 | * | 10/2003 | Shimoyama ................ | 318/560 |
| 6,879,119 B1 | * | 4/2005 | Abe et al. ................... | 318/254 |
| 2004/0046521 A1 | * | 3/2004 | Abe et al. ................... | 318/466 |

FOREIGN PATENT DOCUMENTS

| EP | 1 026 068 A2 | 8/2000 |
|---|---|---|
| WO | WO 99/08374 | 2/1999 |

OTHER PUBLICATIONS

European Search Report dated Feb. 20, 2004.

* cited by examiner

*Primary Examiner*—Marlon T. Fletcher
*Assistant Examiner*—Patrick Miller
(74) *Attorney, Agent, or Firm*—Westerman, Hattori, Daniels & Adrian, LLP

(57) ABSTRACT

A positioning apparatus having a brushless motor, a positioning mechanism, and a motor control circuit to rotate a rotor of the brushless motor by sequentially supplying a driving pulse to a plurality of fixed coils of the brushless motor. The motor control circuit includes a driving pulse generator, a present stage number detector to detect a present stage number of the rotor in accordance with an output signal from at least one magneto-sensitive device of the brushless motor, an initializer to move the movable member to at least a forward or a backward traveling limit within the movable range so as to set the rotor present stage number, and a speed reducer to reduce a rotating speed of the brushless motor by reducing power of the driving pulse when the rotor present stage number is equal to at least a forward traveling or a backward traveling stage number.

16 Claims, 5 Drawing Sheets

MOTOR CONTROL CIRCUIT

DRIVING PULSE GENERATOR

MICRO PROCESSOR

POSITIONING APPARATUS USING BRUSHLESS MOTOR

BACKGROUND OF THE INVENTION

1) Field of the Invention

The present invention relates to a positioning apparatus for positioning a movable member such as a gear ratio determining member which determines a gear ratio of an automatic transmission.

2) Description of the Related Art

In an apparatus used for positioning a movable member, such as a positioning table of a machine tool for a work piece, the movable member such as a nut in mesh with an elongated screw is generally actuated by transmitting a turning force generated by a motor to the screw through a gear attached thereto, thereby allowing the nut to travel along an axial direction of the screw.

Recently, demand for high speed and high precision positioning of the nut is increasing. In response to the demand, the use of a motor that can rotate at a high speed such as a brushless motor is increasing.

Positioning stoppers are generally provided at predetermined locations on the screw such as locations close to extreme ends of the screw in the positioning apparatus so as to define a movable range of the movable member. After the nut reaches a target position, the nut is returned to the positioning stopper. In this instance, the nut heavily collides with the positioning stopper unless the rotating speed of the screw, i.e., the rotating speed of the motor, is sufficiently reduced. Accordingly, the stopper and the nut are damaged due to the collision therebetween.

As an example of an approach to prevent damage due to the collision of the positioning stopper and the nut, a limit switch is provided on a contacting face of the positioning stopper against the nut, so that the motor rotation is stopped by using a signal from the limit switch.

Another example for damage prevention is disclosed in Japanese Patent Kokai (Laid Open Publication) No.3-56527, in which a positional detection is made in front of a target stop position, so that a rotating speed of the motor is shifted to a low speed by using a detection signal thereof.

The aforementioned method using the limit switch requires an additional mechanism, i.e., the limit switch, which leads to an increase in overall system cost including a remodeling cost of the system. In addition, the overall reliability of the apparatus is affected by the reliability of the limit switch.

The control system disclosed in Japanese Patent Kokai No.3-56527 requires a position detecting means such as a sensor. In addition, an instructing step is necessary in advance to register a position data for switching over the rotating speed in practical use. Accordingly, this control system becomes complicated and increases an overall system cost that is similar to the control method using the limit switch.

SUMMARY OF THE INVENTION

An object of the present invention is to provide a positioning controller in an apparatus including a motor driving unit, which can prevent damage due to the collision of a positioning stopper and a nut, without using an additional component such as a limit switch or a position detecting sensor.

A positioning apparatus according to one aspect of the present invention includes a brushless motor, a positioning mechanism to position a movable member within a predetermined movable range in accordance with rotation of the brushless motor, and a motor control circuit to rotate a rotor of the brushless motor by sequentially supplying a driving pulse to a plurality of fixed coils of the brushless motor. The motor control circuit includes driving pulse generating means to generate the driving pulse, present stage number detecting means to detect a present stage number of the rotor in accordance with an output signal from a magneto-sensitive device of the brushless motor, initialization means to move the movable member to at least a forward traveling limit or a backward traveling limit within the movable range so as to set the rotor present stage number as a forward traveling limit stage number or a backward traveling stage number when the movable member reaches the forward traveling limit or the backward traveling limit, and speed reduction means to reduce a rotating speed of the brushless motor by reducing the power of the driving pulse when the rotor present stage number is equal to at least the forward traveling limit stage number or the backward traveling stage number.

DETAILED DESCRIPTION OF THE INVENTION

Embodiments of the present invention will be hereinafter described with reference to the attached drawings.

Figure 1:
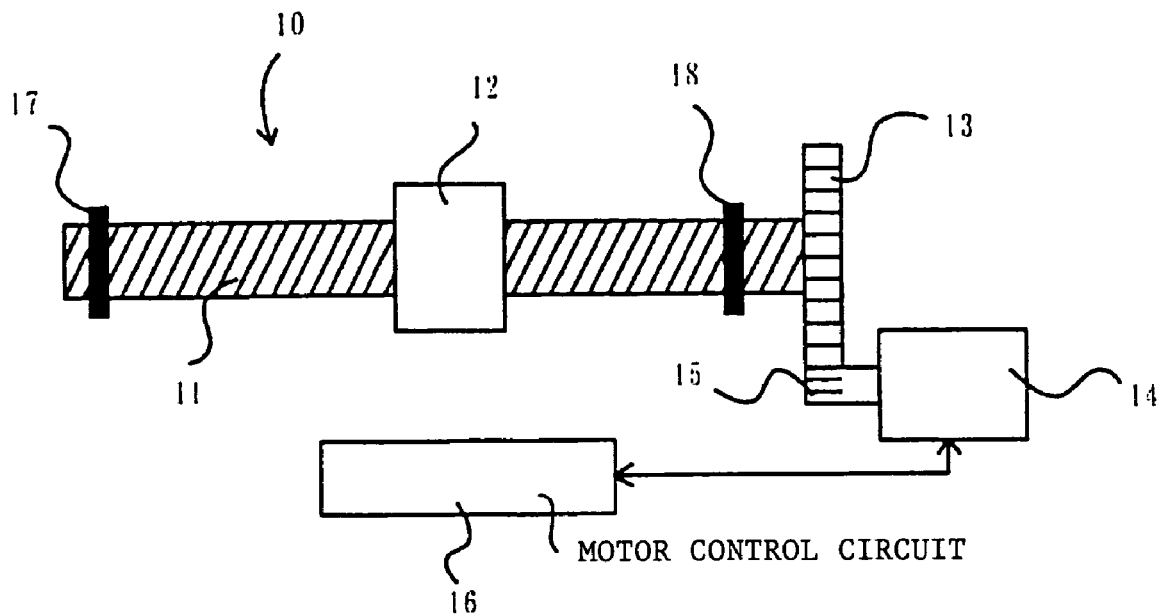
FIG. 1 is a schematic diagram of a positioning controller according to one embodiment of the present invention.

FIG. 1 shows a positioning controller 10 according to an embodiment of the present invention. The positioning controller 10 includes a screw member 11. A nut member 12 adapted to mesh with the screw member 11 is connected with a movable member (not shown) such as a gear ratio determining member, which is provided in an automatic transmission mounted on an automobile. A flat gear 13 is fixed on one end of the screw member 11, so as to mesh with a gear 15 that is connected with a rotating shaft of a motor 14. Accordingly, a turning force of the motor 14 is transmitted to the screw member 11. A motor control circuit 16 is provided to supply a driving pulse signal to the motor 14. Positioning stoppers 17 and 18 adapted to engage with the screw member 11 define a movable range of the nut member 12.

Figure 2:
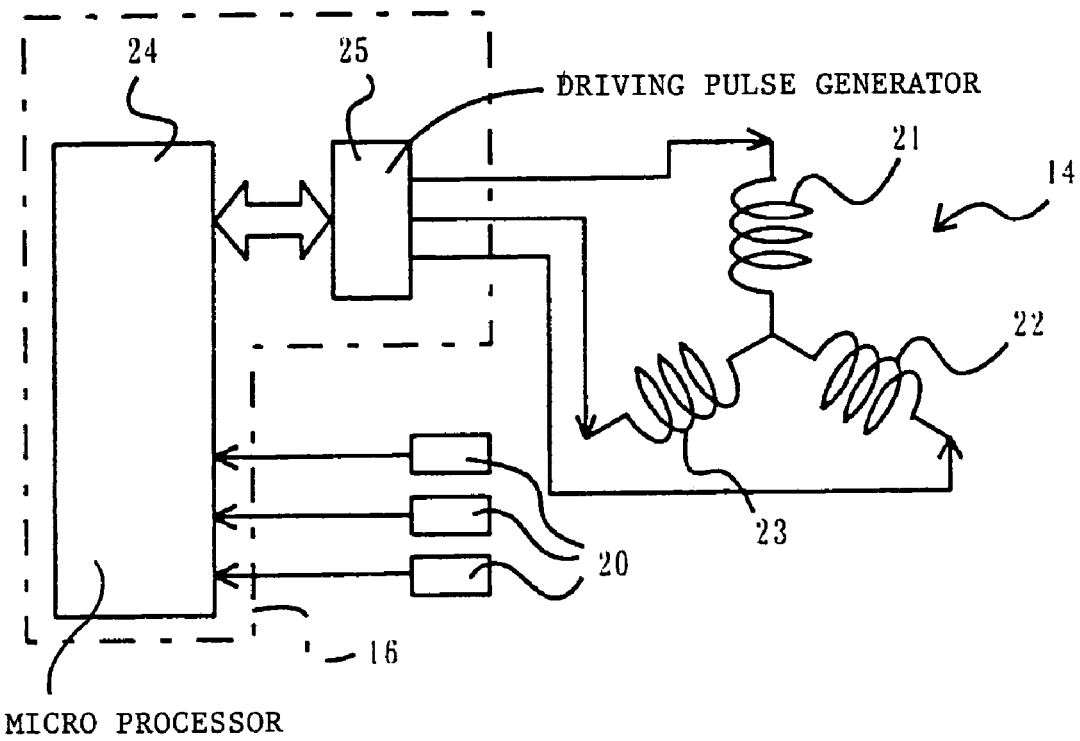
FIG. 2 is a detail view of a motor control circuit shown in FIG. 1.

FIG. 2 shows a detail view of the motor control circuit 16 shown in FIG. 1 and the motor 14 with the relationship therebetween. The motor 14 is a 3-phase brushless motor with a 2-pole rotor therein (not shown), and the motor has three magneto-sensitive devices 20 which respectively output information of an angular position of the rotor. The magneto-sensitive devices 20 may be, for example, a Hall sensor. A U-phase coil 21, a V-phase coil 22 and a W-phase coil 23 which generate an electromagnetic force to rotate the rotor are provided on a stator (not shown) of the motor 14. In the embodiment, three magneto-sensitive devices 20 are provided around the rotor at intervals of 120 degrees with respect to each other. The motor control circuit 16 includes a micro processor 24 and a driving pulse generator 25. The micro processor 24 receives position signals from the magneto-sensitive devices 20, and outputs a rotating command to rotate the rotor in a normal direction or a reverse direction, or a stop command to stop the rotor, to the driving pulse generator 25 via a data line. The driving pulse generator 25 supplies driving pulses to each of the phase coils 21–23, in accordance with the timing of a control pattern, so that the rotor rotates in the normal direction or the reverse direction depending on the type of command supplied from the micro processor 24.

Figure 3:
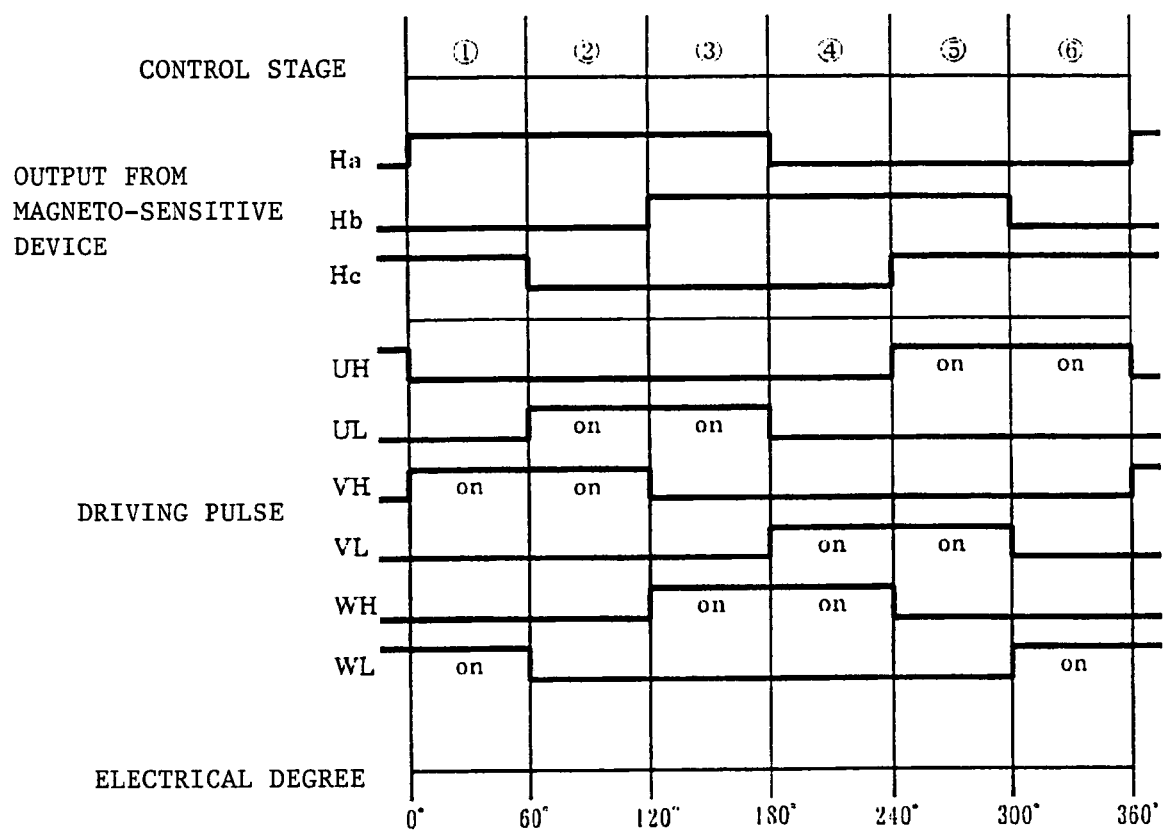
FIG. 3 is a control pattern of motor coils of the motor control circuit shown in FIG. 1.

FIG. 3 shows the control pattern for each of the phase coils. It should be noted that output signals from three magneto-sensitive devices are Ha, Hb and Hc, and driving pulses supplied to three phase coils are UH, UL, VH, VL, WH and WL. Two types of input signals are supplied to each phase coil of the motor as described above, that is, driving pulses supplied to apply a turning force over one side of the rotor (N-pole, for example) is defined as high side pulses (UH, VH and WH), whereas driving pulses supplied to apply a turning force over the other side of the rotor (S-pole, for example) is defined as low side pulses (UL, VL and WL).

As can be understood by FIG. 3, output signals Ha, Hb and Hc from the magneto-sensitive devices each having a pulse width of 180 degrees cooperatively generate a phase shift of 120 degrees. This is because three magneto-sensitive devices are provided around the rotor shaft at intervals of 120 degrees with respect to each other. As a result of the combination of three pulse signals, six control stages are defined as shown in FIG. 3. In response to the six control stages, six motor driving pulses UH-WL are applied to the phase coils 21, 22 and 23. The high side signal and the low side signal each having a pulse width of 120 degrees are in turn applied to each of the phase coils with a resting intervals of 60 degrees therebetween. Specifically, a series of high side signal applying condition, resting condition of signal application, low side signal applying condition and resting condition of signal application are repeated in each of the phase coils.

When the control stage progresses from the stage number 1 to the stage number 6 as shown in FIG. 3, the rotor of the motor 14 turns through 360 degrees. When the stage number 6 is completed, the control stage returns to the stage number 1 again. When a series of stages starting from 1 through 6 are repeated four times, the rotor of the motor rotates 24 stages, which corresponds to a 10 mm movement of the nut member 12 along an axial direction of the screw member 11. Accordingly, a moving direction and a moving distance (stroke) of the nut member 12 can be controlled by supplying the driving pulses to the coils 21–23 of the motor 14 in accordance with the control pattern, that allows the rotor to turn through an angle corresponding to the specified number of stages in the normal direction or the reverse direction. The moving direction of the nut 12 can be reversed by supplying the driving pulses in accordance with the pattern designed to progress through the stage number inversely, which allows the rotor to rotate reversely.

Figure 4:
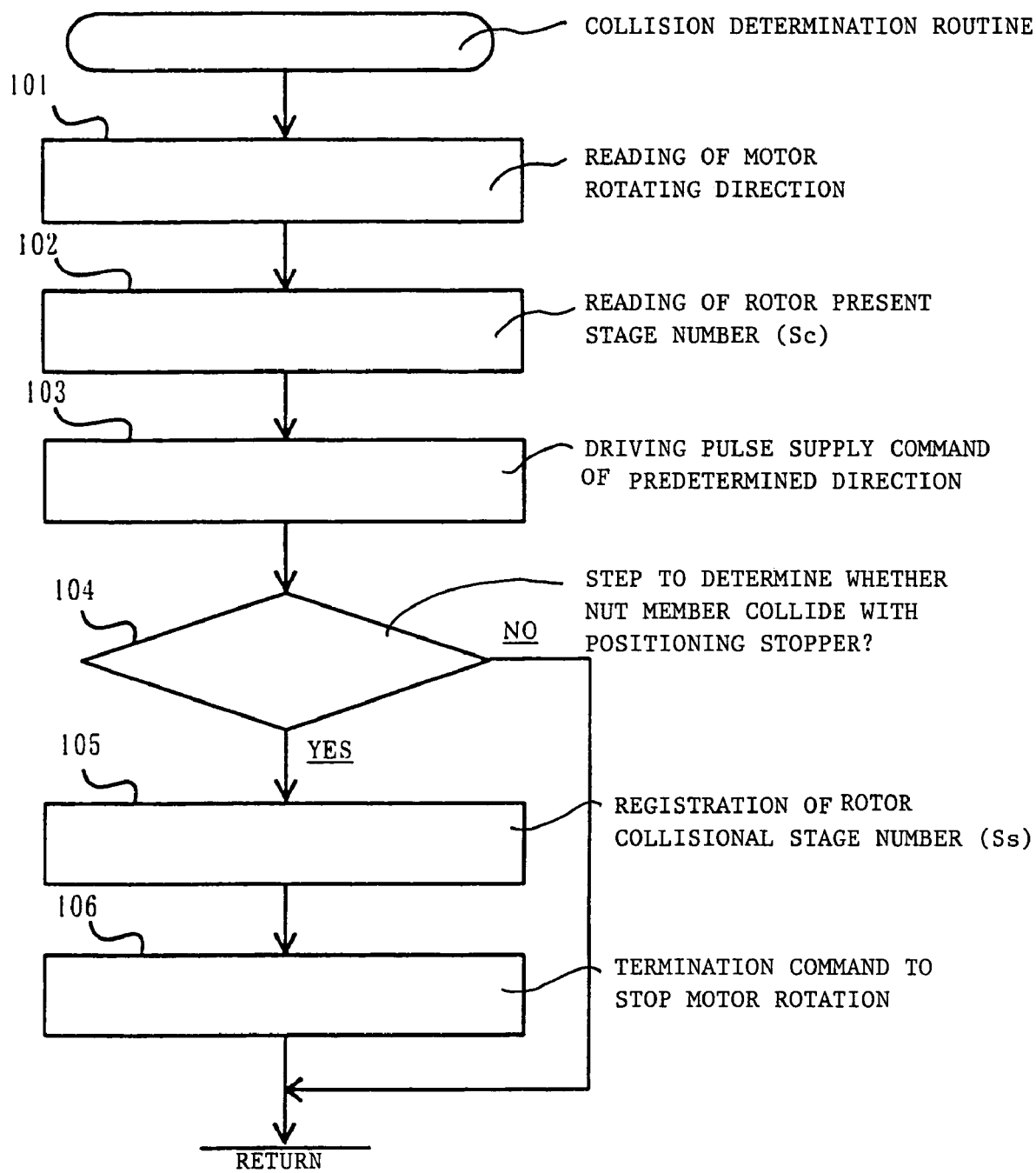
FIG. 4 is a flow chart showing a collision determination routine of the motor control circuit shown in FIG. 1.
Figure 5:
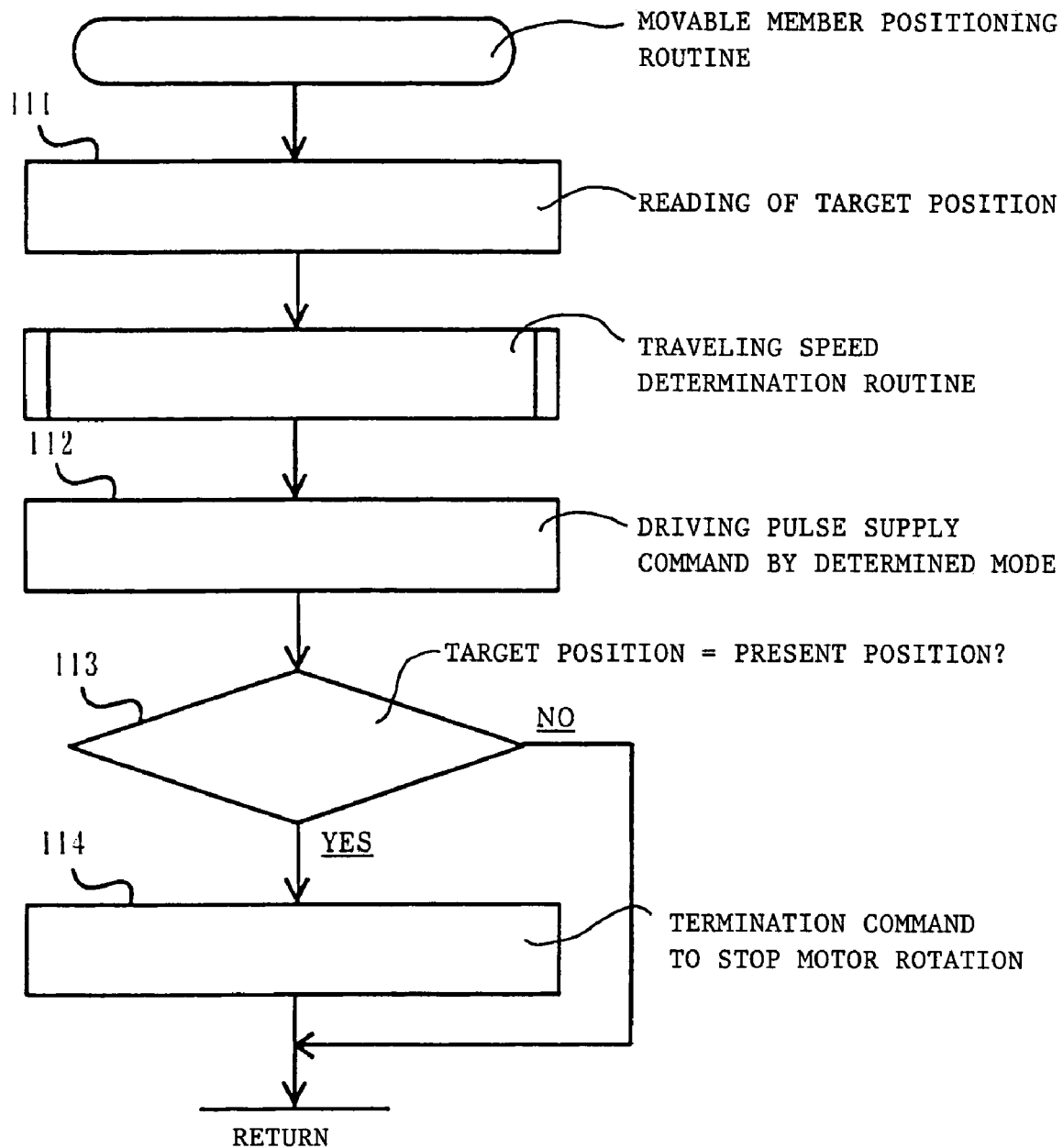
FIG. 5 is a flow chart showing a movable member positioning routine of the motor control circuit shown in FIG. 1.
Figure 6:
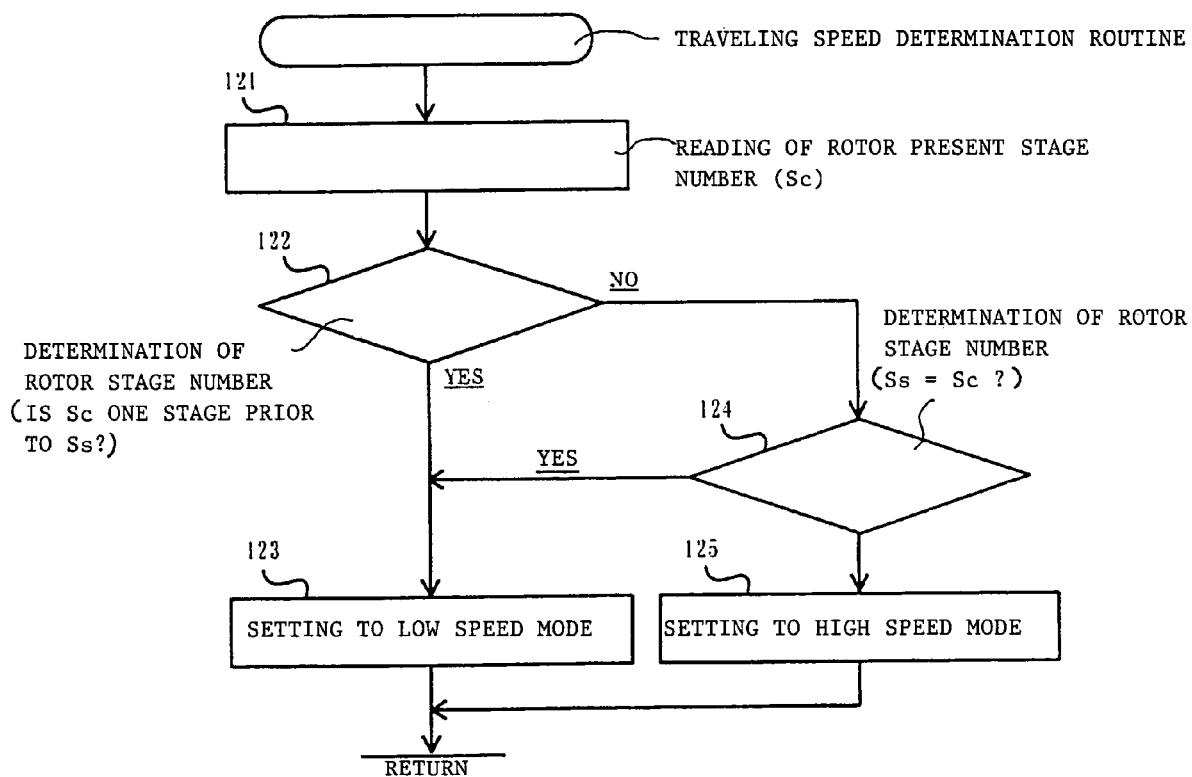
FIG. 6 is a flow chart showing a traveling speed determination routine of the motor control circuit shown in FIG. 1.

FIGS. 4–6 show routines which are performed by the micro processor 24.

FIG. 4 shows a collision determination routine as an initialization step to be carried out by the micro processor 24 so as to control an operation of the positioning controller of the present embodiment. According to the collision determination routine, a rotating direction of the motor 14 is determined depending on the positional relationship between the nut member 12 and the stopper to be provided (step 101). Then, a rotor present stage number corresponding to the present position of the rotor of the motor is registered as a variable Sc (step 102). The traveling direction of the nut member 12 is defined as forward when the stage number during travel is increased, whereas the direction is defined as backward when the stage number is decreased. The rotor present stage number registered in step 102 corresponds to one of the six control stage numbers determined from the combination of the output signals from the three magneto-sensitive devices 20 shown in FIG. 3. Then, a driving pulse supply command is issued in accordance with a pattern to actuate the nut member in the direction determined in step 101 (step 103). Upon receiving the command, the motor 14 starts rotating at a low rotating speed, which corresponds to a speed causing no damage on both the nut member 12 and the positioning stopper, even though the nut member 12 collides with the stopper. Accordingly, the nut member 12 slowly moves toward the positioning stopper. Then, the routine proceeds to a determination step which performs a determination of whether the nut member 12 will collide with the positioning stopper (step 104). When the nut member 12 collides with the positioning stopper, the output signals from the magneto-sensitive devices 20 do not change, nor do control pulses to the motor. When step 104 determines that the nut member 12 collides with the stopper, the present stage number of the rotor is registered as a rotor collision stage number Ss (step 105). The stage number registered in step 105 is one of the control stage numbers described above. When the change of the output signal pattern from the magneto-sensitive devices 20 or the control pulse to the motor is detected in step 104, the nut member 12 is continually actuated without proceeding to steps 105 and 106. After registering the rotor collision stage number in step 105, a termination command is issued to the motor 14 (step 106), and then the operation of the routine is terminated. The aforementioned routine may be skipped until the positioning stopper is displaced for the purpose of changing the location of the positioning stopper. Specifically, a series of steps of the aforementioned routine may be skipped, once the rotor collision stage number Ss is registered in a memory, such as a nonvolatile memory (not shown), unless registered position of the positioning stopper 17 or 18 is displaced.

FIG. 5 shows a positioning routine of the movable member which is performed by the micro processor 24 for the positioning of the nut member 12 in the positioning controller of the embodiment. According to the routine, information of the target position to be reached by the nut member 12, that is specified by a user, is firstly read (step 111). Then, a driving pulse supply command is issued which is determined by a predetermined traveling speed determination routine (step 112). In general, the nut member 12 is actuated at a high speed up to a location that is close to the target position. Thereafter, the traveling speed is reduced, and then the nut member 12 reaches the target position. Then, the routine proceeds to a determination step to determine whether the nut member 12 reaches the target position (step 113). When the nut member 12 reaches the target position, a command is issued to stop the motor rotation (step 114). Accordingly, an actuation control, i.e., the positioning routine is terminated.

When the actuation control toward the target position is finished, another actuation control is performed in which the nut member 12 is returned to an initial position, i.e., a location of the positioning stopper. In the embodiment, the target position is set at the stopper position in step 113 of the movable member positioning routine shown in FIG. 5. Accordingly, the nut member 12 is actuated to the initial position by performing the movable member positioning routine and the traveling speed determination routine shown in FIG. 6.

According to the routine shown in FIG. 6, the rotor present stage number Sc of the motor is first read from an output pattern of the magneto-sensitive devices 20 (step 121). Thereafter, the routine proceeds to a step to determine the stage number of the rotor (step 122). In step 122, when the rotor present stage number Sc is one stage prior to the rotor collision stage number Ss which is registered in the routine shown in FIG. 4, the motor rotation is shifted to a low speed mode (step 123). On the other hand, when the rotor present stage number Sc is not one stage prior to the rotor collision stage number Ss, the routine proceeds to a next determination step (step 124). In step 124, when the rotor present stage number Sc is equal to the rotor collision stage number Ss, the routine proceeds to step 123 in which the motor rotation is shifted to the low speed mode. When the rotor present stage number Sc is not equal to the rotor collision stage number Ss, the routine proceeds to the step in which the motor rotation is shifted to a high speed mode (step 124). Although the foregoing embodiment has been described based on the steps in which the rotating speed is reduced when the rotor present stage number is equal to or one stage prior to the rotor collision stage number, the routine may further include a step, if required, in which the rotating speed is reduced when the rotor present stage number is two stages prior to the rotor collision stage number.

The aforementioned control steps can alleviate the impact of the contact between the stopper and the movable member by reducing the rotating speed of the motor every time the rotor present stage number corresponds to the two stage numbers, that is, the stage number of the contacting position between the positioning stopper and the nut member 12, and the stage number that is one stage prior to the stage number of the contacting position. Accordingly, damage due to a collision of the nut and the positioning stopper can be prevented in an apparatus including a motor driving unit, without using an additional component such as a limit switch or a position detecting sensor. For example, it should be assumed that the stage number of stopper position is 3 (Ss=3) and the nut member moves in the forward traveling direction in the collision determination routine. The driving pulse supply command at the low rotating speed is issued to the motor when the rotor present stage number is 2 (Sc=2, since Sc=Ss−1) and 3 (Sc=3, since Sc=Ss) in the movable member positioning routine. Thus the motor rotating speed is reduced, thereby alleviating the impact of the collision between the nut member 12 and the positioning stopper. On the other hand, when the rotor present stage number is not equal to 2 or 3, the driving pulse supply command at the normal high rotating speed is issued, so that the traveling speed of the nut member 12 can be accelerated.

What is claimed is:

1. A positioning apparatus comprising:
   a brushless motor having a plurality of magneto-sensitive elements and a plurality of fixed coils;
   a positioning mechanism to position a movable member within a predetermined movable range in accordance with rotation of the brushless motor; and
   a motor control circuit to rotate a rotor of the brushless motor by sequentially supplying driving pulses to said fixed coils;
   wherein the motor control circuit comprises:
   driving pulse generating means to generate the driving pulse,
   present stage number detecting means to detect a present stage number to which a current angular position of the rotor belongs in accordance with output signals from said magneto-sensitive elements,
   initialization means to move the movable member to at least a forward traveling limit or a backward traveling limit within the movable range so as to set the detected present stage number as a forward traveling limit stage number or a backward traveling limit stage number when the movable member reaches the forward traveling limit or the backward traveling limit, and
   speed reduction means to reduce a rotating speed of the rotor by reducing power carried by the driving pulses when the detected present stage number is equal to either one of the forward traveling limit stage number and the backward traveling limit stage number.

2. The positioning apparatus according to claim 1, wherein the speed reduction means reduces the rotating speed of the brushless motor when the rotor present stage number is equal to a stage number that is less than one of the forward traveling limit stage number and the backward traveling stage number by at least one.

3. The positioning apparatus according to claim 1, wherein the driving pulse comprises a series of a plurality of pulses, and the speed reduction means issues a command to make each of the plurality of pulses have a reduced duty ratio.

4. The positioning apparatus according to claim 1, wherein the rotor present stage number corresponds to one of six control stage numbers determined from a combination of output signals from three magneto-sensitive devices.

5. The positioning apparatus according to claim 1, wherein the magneto-sensitive device is a Hall sensor as the plurality of magneto-sensitive elements are Hall sensors.

6. The positioning apparatus according to claim 1, wherein at least three magneto-sensitive devices are provided around the brushless motor.

7. The positioning apparatus according to claim 1, wherein the movable member is a gear ratio determining member of an automatic transmission of a vehicle.

8. The positioning apparatus according to claim 1, wherein the stage number increments when the rotor turns through 60 degrees.

9. A positioning apparatus comprising:
   a brushless motor having a plurality of magneto-sensitive elements and a plurality of fixed coils;
   a positioning mechanism to position a movable member within a predetermined movable range in accordance with rotation of the brushless motor; and
   a motor control circuit to rotate a rotor of the brushless motor by sequentially supplying driving pulses to said fixed coils;
   wherein the motor control circuit comprises:
   a driving pulse generator to generate the driving pulses,
   a present stage number detector to detect a present stage number to which a current angular position of the rotor belongs in accordance with output signals from said magneto-sensitive elements,
   an initializer to move the movable member to at least a forward traveling limit or a backward traveling limit within the movable range so as to set the detected present stage number as a forward traveling limit stage number or a backward traveling limit stage number when the movable member reaches the forward traveling limit or the backward traveling limit, and a speed reducer to reduce a rotating speed of the rotor by reducing power carried by the driving pulses when the detected present stage number is equal to either one of the forward traveling limit stage number and the backward traveling limit stage number.

10. The positioning apparatus according to claim 9, wherein the speed reducer reduces the rotating speed of the brushless motor when the rotor present stage number is equal to a stage number that is less than one of the forward traveling limit stage number and the backward traveling stage number by at least one.

11. The positioning apparatus according to claim 9, wherein the driving pulse comprises a series of a plurality of pulses, and the speed reducer issues a command to make each of the plurality of pulses have a reduced duty ratio.

12. The positioning apparatus according to claim 9, wherein the rotor present stage number corresponds to one of six control stage numbers determined from a combination of output signals from three magneto-sensitive devices.

13. The positioning apparatus according to claim 9, wherein the magneto-sensitive device is a Hall sensor.

14. The positioning apparatus according to claim 9, wherein at least three magneto-sensitive devices are provided around the brushless motor.

15. The positioning apparatus according to claim 9, wherein the movable member is a gear ratio determining member of an automatic transmission of a vehicle.

16. The positioning apparatus according to claim 9, wherein the stage number increments when the rotor turns through 60 degrees.

* * * * *